US007089000B1

(12) United States Patent
Chang et al.

(10) Patent No.: US 7,089,000 B1
(45) Date of Patent: *Aug. 8, 2006

(54) MULTI-NODE WIRELESS COMMUNICATION SYSTEM WITH MULTIPLE TRANSPONDING PLATFORMS

(75) Inventors: Ming U. Chang, Rancho Palos Verdes, CA (US); Kar W. Yung, Torrance, CA (US); Frank A. Hagen, Palos Verdes Estates, CA (US); Donald C. D. Chang, Thousand Oaks, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 1135 days.

This patent is subject to a terminal disclaimer.

(21) Appl. No.: 09/584,012

(22) Filed: May 30, 2000

Related U.S. Application Data (63) Continuation-in-part of application No. 09/271,997, filed on Mar. 18, 1999, now Pat. No. 6,337,980.

(51) Int. Cl.
*H04Q 7/20* (2006.01)
(52) U.S. Cl. ..................... 455/430; 455/13.1
(58) Field of Classification Search ........ 455/427–430, 455/431, 443, 445, 448, 456.1, 10, 502, 60, 455/67.16, 503, 13.1, 13.2, 13.3
See application file for complete search history.

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 342/357 |
| 3,544,995 A | 12/1970 | Bottenberg et al. | 342/46 |
| 4,161,730 A | 7/1979 | Anderson | 342/352 |
| 4,161,734 A | 7/1979 | Anderson | 343/100 |
| 4,255,814 A * | 3/1981 | Osborn | 455/503 |
| 4,359,733 A | 11/1982 | O'Neill | 343/6.5 |
| 4,613,864 A | 9/1986 | Hofgen | 343/357 |

(Continued)

FOREIGN PATENT DOCUMENTS

EP 0 335 558 4/1989

(Continued)

OTHER PUBLICATIONS

K. K. Chan, F. Marcoux, M. Forest, L. Martins-Camelo, "A Circularly Polarized Waveguide Array for Leo Satellite Communications", pp. 154-157, IEEE1999 AP-S International Symposium, Jun. 1999.

(Continued)

*Primary Examiner*—Quochien B. Vuong
*Assistant Examiner*—Lewis West
(74) *Attorney, Agent, or Firm*—Georgann S. Grunebach (57) ABSTRACT

A mobile wireless communications system including a plurality of individual transponding platforms all in communication with a central processing hub. A signal processed by the central processing hub is radiated simultaneously through multiple paths to a plurality of the individual transponding platforms. The signal transmitted to each transponding platform by the hub is appropriately delayed by the hub so as to equalize the differential delay of all such signals from a given receiver location. The radiated signal is then re-radiated by each of the plurality of individual transponding platforms to a mobile satellite terminal that receives the re-radiated signal from the plurality of individual transponding platforms. The signals from the plurality of transponding platforms are all received coherently by the intended user, and incoherently by all other users.

18 Claims, 4 Drawing Sheets

U.S. PATENT DOCUMENTS

| | | | | |
|---|---|---|---|---|
| 4,718,109 A * | 1/1988 | Breeden et al. | ............ | 455/503 |
| 4,897,661 A | 1/1990 | Hiraiwa | ............ | 342/457 |
| 4,994,809 A | 2/1991 | Yung et al. | ............ | 342/108 |
| 5,006,855 A | 4/1991 | Braff | ............ | 342/357 |
| 5,099,245 A | 3/1992 | Sagey | ............ | 342/357 |
| 5,111,209 A | 5/1992 | Toriyama | ............ | 342/357 |
| 5,126,748 A | 6/1992 | Ames et al. | ............ | 342/353 |
| 5,155,859 A * | 10/1992 | Harris et al. | ............ | 455/503 |
| 5,361,398 A * | 11/1994 | Christian et al. | ............ | 455/503 |
| 5,387,916 A | 2/1995 | Cohn | ............ | 342/44 |
| 5,410,314 A | 4/1995 | Frush et al. | ............ | 342/26 |
| 5,423,059 A | 6/1995 | LoGalbo et al. | ............ | 455/51.2 |
| 5,444,450 A | 8/1995 | Olds et al. | ............ | 342/357 |
| 5,525,995 A | 6/1996 | Benner | ............ | 342/90 |
| 5,555,257 A | 9/1996 | Dent | ............ | 370/95.1 |
| 5,589,834 A | 12/1996 | Weinberg et al. | ............ | 342/354 |
| 5,739,785 A | 4/1998 | Allison et al. | ............ | 342/357 |
| 5,764,188 A | 6/1998 | Ghosh et al. | ............ | 342/457 |
| 5,805,983 A * | 9/1998 | Naidu et al. | ............ | 455/67.16 |
| 5,810,284 A * | 9/1998 | Hibbs et al. | ............ | 244/13 |
| 5,839,053 A | 11/1998 | Bosch et al. | ............ | 455/13.1 |
| 5,867,109 A | 2/1999 | Wiedeman | ............ | 340/827 |
| 5,903,549 A | 5/1999 | Von der Embse et al. | .. | 370/310 |
| 5,920,284 A | 7/1999 | Victor | ............ | 342/357.01 |
| 5,940,774 A * | 8/1999 | Schmidt et al. | ............ | 455/561 |
| 5,944,770 A | 8/1999 | Enge et al. | ............ | 701/707 |
| 5,945,948 A | 8/1999 | Buford et al. | ............ | 342/457 |
| 5,949,766 A | 9/1999 | Ibanez-Meier et al. | | |
| 5,969,674 A | 10/1999 | Von der Embse et al. | ............ | 342/357.17 |
| 5,974,039 A | 10/1999 | Schilling | ............ | 370/335 |
| 6,020,845 A | 2/2000 | Weinberg et al. | | |
| 6,138,020 A * | 10/2000 | Galyas et al. | ............ | 455/436 |
| 6,151,308 A | 11/2000 | Ibanez-Meier et al. | | |
| 6,175,737 B1 * | 1/2001 | Kao | ............ | 455/447 |
| 6,229,477 B1 | 5/2001 | Chang et al. | ............ | 342/357.01 |
| 6,246,363 B1 | 6/2001 | Yung et al. | ............ | 342/357.14 |
| 6,295,440 B1 * | 9/2001 | Chang et al. | ............ | 455/13.1 |
| 6,337,980 B1 * | 1/2002 | Chang et al. | ............ | 455/430 |
| 6,340,947 B1 | 1/2002 | Chang et al. | | |
| 6,633,559 B1 * | 10/2003 | Asokan et al. | ............ | 370/350 |
| 2001/0000167 A1 | 4/2001 | Chang et al. | ............ | 455/13.1 |
| 2001/0045903 A1 | 11/2001 | Chang et al. | | |
| 2003/0208317 A1 | 11/2003 | Chang | | |

FOREIGN PATENT DOCUMENTS

| | | |
|---|---|---|
| EP | 0 682 416 A2 | 11/1995 |
| EP | 0 749 252 A2 | 12/1996 |
| EP | 0 837 568 A | 4/1998 |
| EP | 0 845 874 A2 | 6/1998 |
| EP | 0 860 709 A | 8/1998 |
| EP | 0 860 710 A | 8/1998 |
| EP | 0860 708 A | 8/1998 |
| EP | 1 010 988 A2 | 6/2000 |
| EP | 1 037 403 A2 | 9/2000 |
| GB | 2 271 902 A | 10/1993 |
| GB | 2 306 827 A | 5/1997 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| WO | WO 90 13186 A | 11/1990 |

OTHER PUBLICATIONS

M. Oodo, R. Miura, Y. Hase, "Onboard DBF Antenna for Stratospheric Platform", pp. 125-128, IEEE Conference on Phased Array Systems and Technology, California, May 21-25, 2000.

Yokosuka Research Park, "The First Stratospheric Platform Systems Workshop", pp. 1-216, may 12-13, 1999.

Teles J et al.: "Overview of TDRSS" Orbit Determination and Analysis. PSD Meeting, Cospar Technical Panel on Satellite Dynamics, 13th Cospar Scientific Assembly, Hamburg, Germany, Jul. 11-21, 1994, Advances in Space Research, pp. 67-76.

Bricker, P et al.: "Integrated Receiver for NASA Tracking and Data Relay Satellite System", MILCOM 90. A new Era, 1990 IEEE Military Communications Conference, Monterey, CA, USA, Sep. 30-Oct. 3, 1990, p. 1-5.

Dunham, J B, et al.: "Onboard Orbit Estimation with Tracking and Data Relay Satellite System Data", Journal of Guidance, Control, and Dynamics, Jul.-Aug. 1983, USA, vol. 6 NR.4, pp. 292-301.

K. H. Bethke, "A Novel Noncooperative Near-Range Radar Network or Traffic Guidance and Control on Airport Surfaces", IEEE Transactions on Control Systems Technology, vol. 1, No. 3, Sep. 1993.

Doc 9524 FANS/4-WP/76, International Civil Aviation Organization, Special Committee on Future Air Navigation Systems, Fourth Meeting, Montreal, May 2-20, 1988, Report, pp. 3.2B-2 & 3.2B-3.

* cited by examiner

MULTI-NODE WIRELESS COMMUNICATION SYSTEM WITH MULTIPLE TRANSPONDING PLATFORMS

CROSS-REFERENCE TO RELATED APPLICATIONS

The present application is a continuation-in-part of assignee's U.S. Ser. No. 09/271,997, entitled "Multiple Satellite Mobile Communications Method and Apparatus for Hand-Held Terminals," filed on Mar. 18, 1999 now U.S. Pat. No. 6,337,980.

TECHNICAL FIELD

The present invention relates generally to a wireless communication system. More specifically, the present invention relates to a wireless communication system with increased frequency re-use capability for point-to-point communication.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain hand-held terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized here to refer to frequency, time slot or CDMA code) resources. Any given frequency over a given ground position can only be utilized by one user at a time. Thus, if one user accesses a satellite using a particular frequency to communicate to his counterpart on the network, other satellites and/or users in the same region cannot reuse the same frequency resource in the same local area. In particular, if a nearby secondary user has a handset that requires the same frequency resource as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one limitations on frequency re-use for point-to-point communications.

It is another object of the present invention to provide a wireless communication system that utilizes individual transponders and mobile terminals that are relatively simple and of low complexity.

It is a further object of the present invention to provide a wireless communication system with high system reliability through graceful degradation.

It is still another object of the present invention to provide a wireless communication system wherein the complexity of the system is concentrated at the central processing hub stations.

It is yet another object of the present invention to provide a wireless communication system with more accurate capabilities for satellite and/or user positioning.

In accordance with the objects of the present invention, a mobile wireless communication system is provided. The mobile wireless communications system includes a plurality of individual communication transponding platforms. The plurality of individual transponders are each in user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the link.

It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a wireless communication system with reduced communication with a central processing hub such that a signal processed by the central processing hub in the forward link is radiated with compensating time delays to the plurality of individual transponders. The radiated signals are then re-radiated by the plurality of individual transponders and coherently received and processed by a mobile user terminal. The return link signal path is the reverse of the forward link.

These and other features of the present invention will become apparent from the following description of the invention, when viewed in accordance with the accompanying drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation on the operation of multiple satellites, the overall capacity of existing mobile satellite and wireless communication systems can more readily expand.

Figure 1:
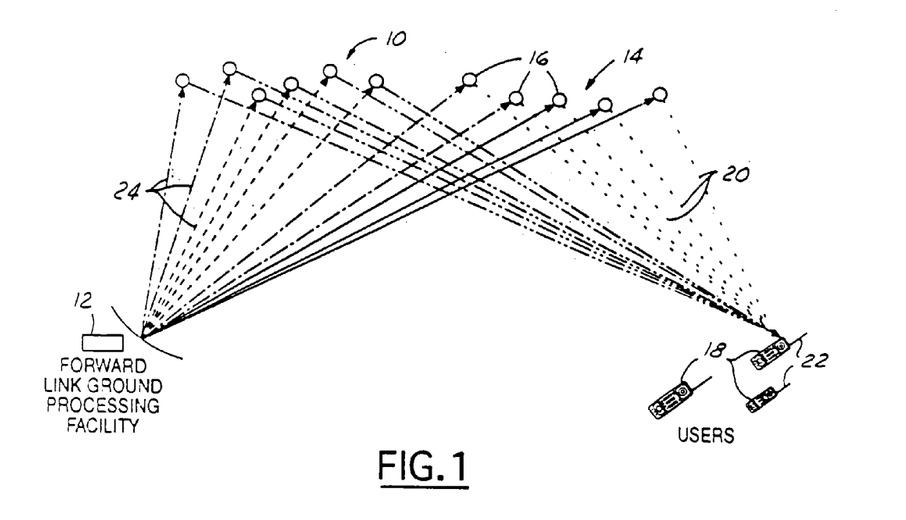
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 comprised of a plurality of individual satellites 16, and a plurality of hand-held user terminals 18 such as mobile phones. As discussed in more detail below, the user terminals 18 can receive signals 20 simultaneously from multiple satellites 16 via broad beam antennas 22. The ground telecommunications hub 12 is in communication with all of the satellites 16 in the satellite constellation 14 individually and simultaneously. The hub 12 also pre-processes user signals to compensate for path differentials before sending radiated signals 24 to the satellites 16, as discussed in more detail below, and similarly post-processes signals received from the satellites.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beam-forming and filtering, as discussed below.

Figure 2:
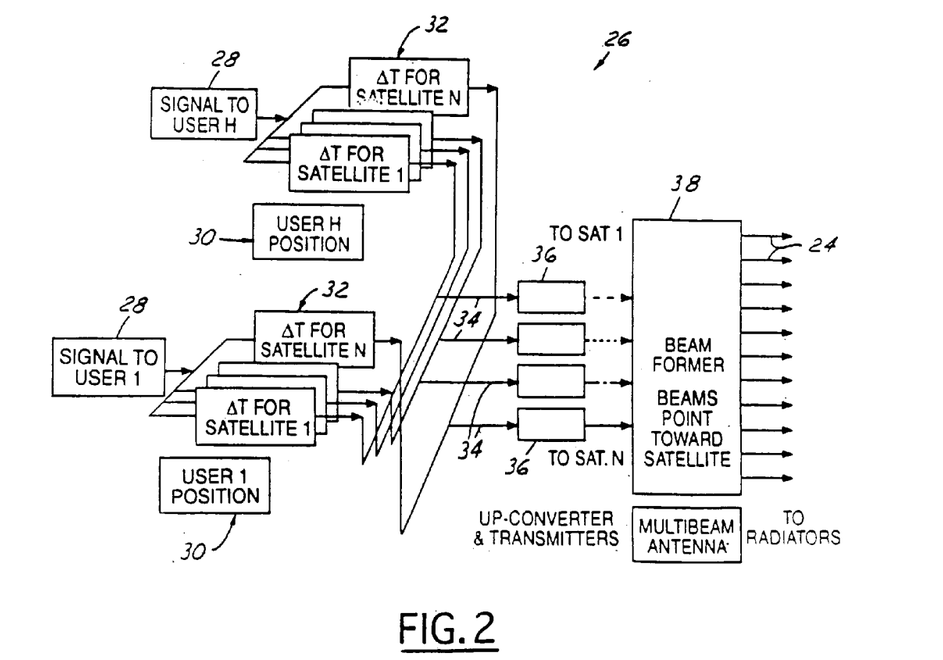
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information is preferably within a tenth of an RF wavelength. For UHF satellite systems, the required path differential accuracy must be about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The positions of the various users (1 to H), designated by reference number 30, are determined generally by the circuitry from the various user signals 28. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beam-forming processing is done so that the signals can be transmitted to each of the N satellites via radiating signals 24. The beam-forming process can be done in baseband or a low IF frequency band by either digital or analog means. For a low bandwidth (less than a few MHz) signal, digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand-held terminal 22.

Equivalently, the effect of the spatial processing performed by the processing center 26 is to focus signal strength on the user from multiple satellites 16, which act like sparsely separated portions of a large active reflector. Therefore, the processing on the ground will insert different time delays into the signals 24 which are radiated via various paths (i.e., transponders). The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
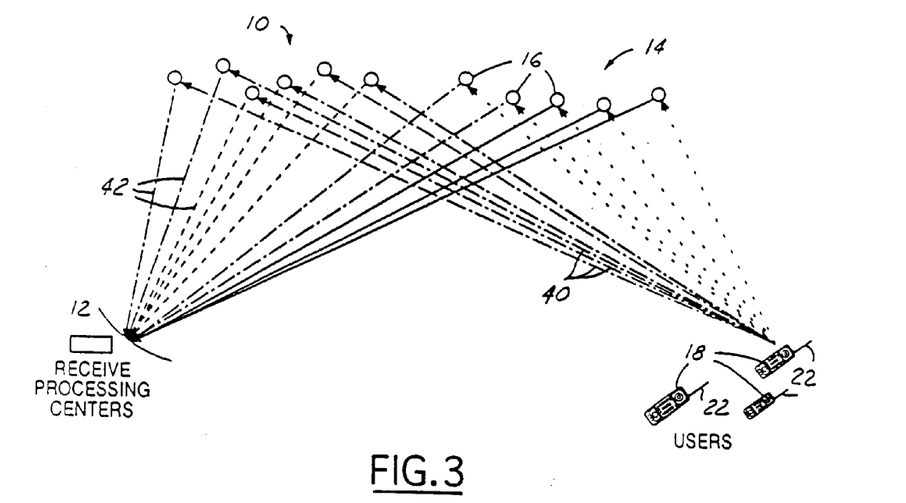
FIG. 3 is a schematic illustration of the return link geometry of a wireless communications system in accordance with a preferred embodiment of the present invention.

In receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
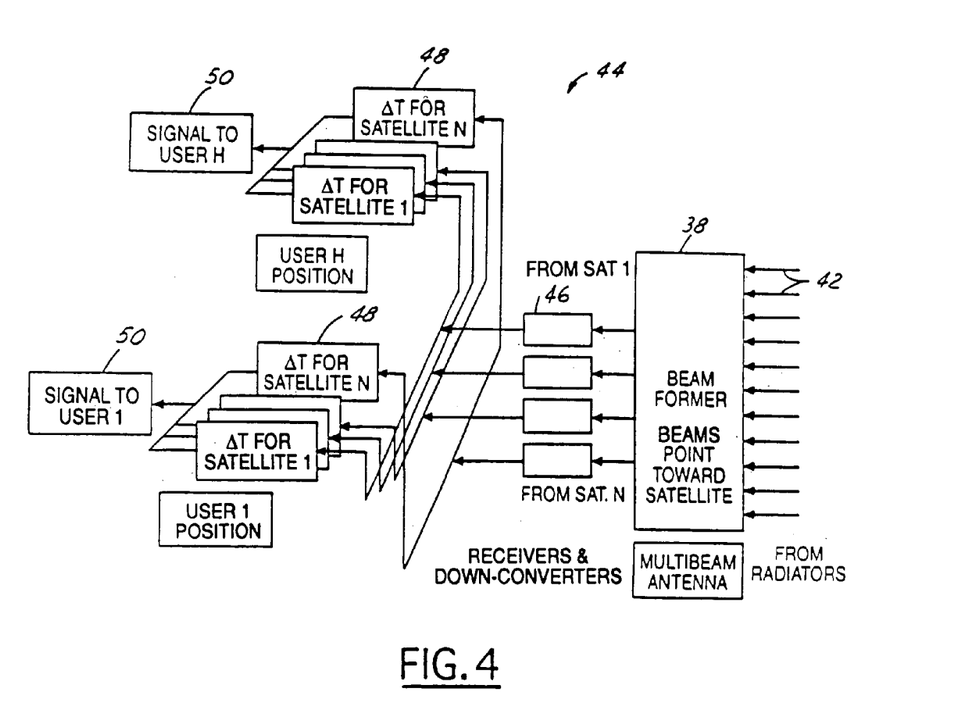
FIG. 4 is a schematic block diagram illustrating the signal receive function of a ground telecommunications hub for a wireless communications system in accordance with a preferred embodiment of the present invention.

The signal flows on the block diagram shown in FIG. 4 illustrate the receive function of the post-processor 40 and the hub 12. The signal flows are reversed from the corresponding ones in FIG. 2. Therefore the receive process will not be reiterated in detail. However, the links 42 from the satellites 16 to the hub 12 are received at the beam-former 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit functions are necessary parts of the pathlink calibration and user positioning.

The technique of the present invention has been demonstrated to significantly reduce the average sidelobe levels. It has been determined that this is due to three factors. First, the proposed architecture is not a periodic array, but rather a randomly spaced sparse array, which has no grating lobes. Although the average sidelobe level at a single frequency is relatively high, the level decreases with increasing bandwidth. Second, the large sparsely filled array formed by the satellites is a large extended aperture. Thus, all of the users on the ground are in the near field of the extended aperture and the wavefronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth. The information signal will therefore be spread over this bandwidth via CDMA or through short duration waveforms for TDMA schemes.

Figure 5:
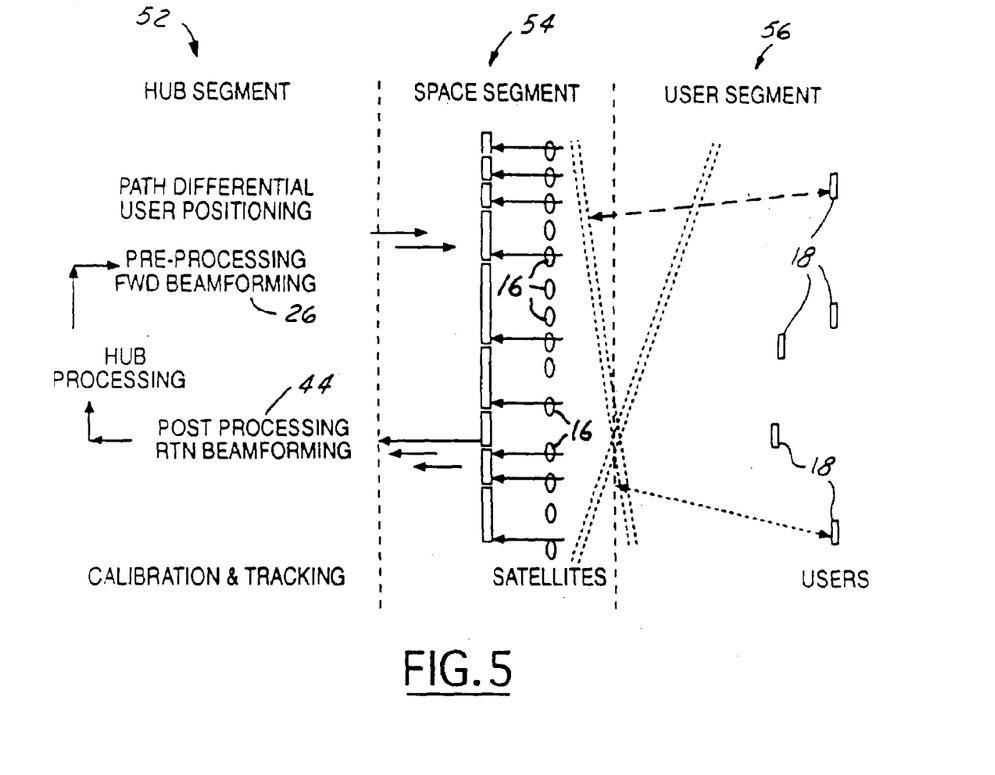
FIG. 5 is a schematic flow diagram illustrating the overall architecture for a multiple transponder wireless communications system in accordance with a preferred embodiment of the present invention.

FIG. 5 illustrates diagrammatically the operation of the invention, which allows for the increased re-use of precious frequency spectrum by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. The system also benefits from the large percentage bandwidths available with CDMA and TDMA systems.

As shown in FIG. 5, the present invention is divided into three segments: a hub segment 52 containing the ground telecommunications hub 12, a space segment 54 containing a plurality of individual satellites 16, and a user segment 56, having a plurality of user terminals 18. The hub segment also has a processing center 26 which pre-processes the transmittal signals and post-processer 44 for post-processing the received signals.

The user terminals 18 receive and transmit signals simultaneously from/to multiple satellites 16 via broad band antennas. The user terminals 18 do not require any capability to separately address the individual satellites 16 in the space segment 54. The hub 12 pre-processes the signals intended for each local user on transmission and post-processes the signals supplied to each local user on reception to compensate for path differentials. These corrections are separately computed and applied to the signals transmitted to or received from each satellite 16 of the space segment 54. While the invention thus far has been discussed in connection with a plurality of satellites 16, it should be understood that a variety of other transponder nodes can be utilized instead of or in combination with one or more of the satellites 16.

Figure 6:
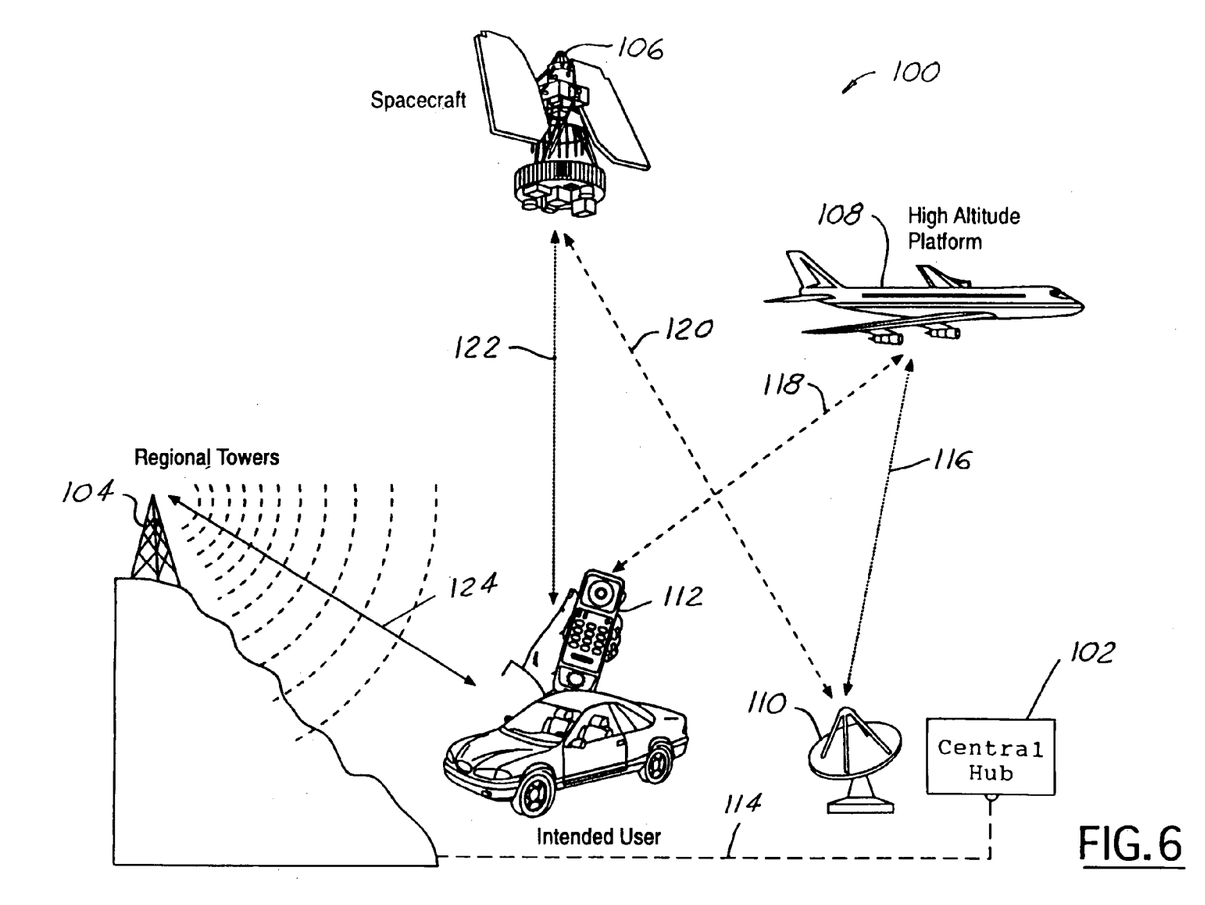
FIG. 6 is a schematic illustration of a wireless communication system for point-to-point communication using a variety of different types of transponder nodes in accordance with a preferred embodiment of the present invention.

Referring now to FIG. 6, an exemplary wireless communication system 100 in accordance with the preferred embodiment is illustrated. The exemplary wireless communication system 100 includes a central hub 102, a transmitter tower 104, a satellite transponder 106, a high altitude platform 108, an antenna 110, and an intended user 112. The intended user 112 may be either a fixed user or a mobile user.

The central hub 102 is in direct communication with the antenna 110 in order to process the signals transmitted to and received from the antenna 110, in accordance with the techniques described above. In accordance with this exemplary embodiment, the central hub 102 also communicates with the transmitter tower 104 through line 114 in order to perform the processing of signals transmitted to and received from the transmitter tower 104. The line 114 may be a ground wire or may represent a wireless communication between the central hub 102 and the transmitter tower 104. Further, while only a single antenna 110 and a single tower 104 are illustrated, it will be understood that multiple antennas and multiple towers may be employed. Further, the tower 104 may be part of a regional or national tower-based cellular network for either fixed or mobile communications.

As shown, in the example, the central hub 102 processes signals 116 that are transmitted from the antenna 110 to a high altitude platform 108. In the forward link, the signal 116 is then transmitted from the high altitude platform 108 to the intended user 112, as represented generally by the signal 118. In the return link, the intended user sends a signal 118 to the high altitude platform 108 which then sends a signal 116 to the antenna 110, which is then processed by the central hub 102. Further, the central hub 102 also processes signals 120 that are transmitted by the antenna 110 to a satellite transponder 106. The satellite transponder 106 then transmits the signal 122 to the intended user 112. In the return link, the intended user 112 sends a signal 122 to the satellite transponder 106, which then sends the signal 120 to the antenna 110 for processing by the central hub 102.

Additionally, the central hub 102 sends a signal 114 to the transmitter tower 104, which in turn communicates with the intended user 112 through a signal 124. In the return link, the intended user 112 communicates with the tower 104 through a signal 124, which then communicates with the central hub 102 through line 114 for processing of the signal. While only a single transponder node (i.e., satellite, high altitude platform or tower) of each type is disclosed, a specific system may utilize any combination of such transponder nodes. It should be understood that any high altitude platform system such as manned/unmanned airships, balloons, or airplanes may be utilized in accordance with the disclosed system. Further, any space-based system that involves one or more spacecraft for point-to-point communications may be utilized in accordance with the disclosed system.

The disclosed exemplary system 100 can greatly improve frequency re-use efficiency for point-to-point communications such as those in multiple telephone and two-way Internet protocol. This improved capability results from the fact that the information for the intended receiver (user) 112 will arrive from all transponders in-phase. By this configuration, information for non-intended users will generally arrive out-of-phase. For non-intended users, the out-of-phase signals will appear as noise. The performance of the proposed invention will depend upon the spatial separations between the various transponder nodes, as well as the remote users. The communication bandwidths between the transponders and the users will also impact the performance. The effect of these on the disclosed system 100 can be determined in a variety of known ways.

Thus, the present system 100 can be comprised of a plurality of transponder nodes that are solely part of a pure tower-based system, a system of high altitude platforms, such as a stratospheric platform, or a communications satellite system. Alternatively, the system can consist of a plurality of transponders that are selected from all of or some of the above types of transponder nodes.

Having now fully described the invention, it will be apparent to one of ordinary skill in the art that many changes and modifications can be made thereto without departing from the spirit or scope of the invention as set forth herein.

The invention claimed is:

1. A mobile wireless communication system, comprising:
   a plurality of individual transponding nodes;
   a central processing hub in communication with each of the plurality of individual transponding nodes, such that a downlink signal processed by said central processing hub is preprocessed so that the signal is radiated using a plurality of radiated signals with compensating time delays to the plurality of said individual transponding nodes; and
   a plurality of mobile terminals associated with respective remote users for receiving said radiated signals from each of said plurality of individual transponding nodes simultaneously so that the radiated signals are added together coherently and thereafter simultaneously generating a return signal and directing the return signal through the plurality of individual transponding nodes;
   said central processing hub processing the return signal to compensate for path differentials.

2. The wireless communication system of claim 1, wherein one or more of said plurality of individual transponding nodes is an individual satellite.

3. The wireless communication system of claim 1, wherein one or more of said plurality of individual transponding nodes is a high altitude platform.

4. The wireless communication system of claim 1, wherein one or more of said plurality of individual transponding nodes is a transmitter tower.

5. The wireless communication system of claim 1, wherein one or more of said plurality of individual transponding nodes is a balloon.

6. The wireless communication system of claim 1, wherein said central processing hub processes said signal such that all intended signals will arrive in-of-phase for an intended remote user, and out-of-phase for all other remote users.

7. The wireless communication system of claim 1, wherein in a reverse link mode, said plurality of mobile terminals transmit signals to said plurality of individual transponding nodes, which then radiate said signals to said central processing hub for processing.

8. A method for communicating with a mobile hand-held terminal, comprising:
   processing a local user signal for both forward and return links at a central processing hub;
   radiating said signal through multiple paths or transponder nodes;
   receiving said signals at a plurality of transponding nodes;
   re-radiating said signals from said plurality of transponding nodes to the mobile hand-held terminal;
   receiving said forward link signals from said plurality of transponding nodes at the mobile hand-held terminal whereby said re-radiated signal will be received coherently only for an intended remote user associated with the mobile hand-held terminal;
   transmitting a plurality of return signals from the mobile hand-held terminal to the central processing hub through the paths or transponder node; and
   post-processing the plurality of return time signals to compensate for path differentials by the hub processor.

9. The method of claim 8, further comprising:
   transmitting said return link signals to said plurality of transponding nodes from mobile hand-held terminals whereby signals are processed coherently by the hub processor.

10. The method of claim 8, wherein said signals are received by a high altitude platform system.

11. The method of claim 10, wherein said signals are received by a plurality of manned or unmanned airships.

12. The method of claim 10, wherein said signals are received by a plurality of balloons.

13. The method of claim 10, wherein said signals are received by a plurality of manned or unmanned airplanes.

14. The method of claim 8, wherein said signals are received by a tower based cellular network.

15. The method of claim 8, wherein said signals are received by a space based system.

16. A mobile wireless communication system for mobile users, comprising:
   a plurality of individual transponder nodes selected from one or more of the following node types: a tower based cellular network, a high altitude platform system or a space-based satellite system;
   a central processing hub in communication with each of said plurality of individual transponder nodes, whereby a signal processed by said central processing hub is radiated with compensating time delays to said plurality of individual transponders; and a mobile terminal associated with an intended user for receiving said radiated signals from each of said plurality of individual transponder nodes coherently thereafter simultaneously generating a return signal and directing the return signal through the plurality of individual transponding nodes;

whereby said radiated signals, if received by a non-intended user, are received incoherently;

said central processing hub processing the return signal to compensate for path differentials.

17. The mobile wireless communication system of claim 16, wherein said plurality of individual transponder nodes that radiate said signals to said intended user are all of the same type.

18. The mobile wireless communication system of claim 16, wherein said plurality of individual transponder nodes that radiate said signals to said intended user are selected from at least two or said platforms.

* * * * *